US009219815B2

(12) United States Patent
Cohen et al.

(10) Patent No.: US 9,219,815 B2
(45) Date of Patent: Dec. 22, 2015

(54) IDENTIFIER TECHNIQUE FOR COMMUNICATION INTERCHANGE

(75) Inventors: Alexander J. Cohen, Mill Valley, CA (US); Edward K. Y. Jung, Bellevue, WA (US); Royce A. Levien, Lexington, MA (US); Robert W. Lord, Seattle, WA (US); Mark A. Malamud, Seattle, WA (US); William Henry Mangione-Smith, Kirkland, WA (US); John D. Rinaldo, Jr., Bellevue, WA (US); Clarence T. Tegreene, Bellevue, WA (US)

(73) Assignee: Triplay, Inc., New York, NY (US)

( * ) Notice: Subject to any disclaimer, the term of this patent is extended or adjusted under 35 U.S.C. 154(b) by 1554 days.

(21) Appl. No.: 11/517,027

(22) Filed: Sep. 7, 2006

(65) Prior Publication Data

US 2008/0140651 A1  Jun. 12, 2008

Related U.S. Application Data

(63) Continuation-in-part of application No. 11/506,415, filed on Aug. 18, 2006, now Pat. No. 8,346,872.

(51) Int. Cl.
*G06F 15/16* (2006.01)
*H04M 3/493* (2006.01)
*H04L 12/18* (2006.01)
*H04M 7/00* (2006.01)
*H04L 29/06* (2006.01)

(52) U.S. Cl.
CPC ......... *H04M 3/4931* (2013.01); *H04L 12/1822* (2013.01); *H04L 65/403* (2013.01); *H04M 7/0036* (2013.01); *H04L 65/1066* (2013.01)

(58) Field of Classification Search
USPC ..................... 348/14.02, 14.07, 14.08, 14.09; 379/93.09, 93.21, 93.23, 207.13, 379/207.14, 207.15; 455/416, 518, 519, 455/566, 415; 709/204–205, 227
See application file for complete search history.

(56) References Cited

U.S. PATENT DOCUMENTS

| | | | |
|---|---|---|---|
| 6,018,668 A * | 1/2000 | Schmidt ...................... 455/518 |
| 6,154,531 A | 11/2000 | Clapper | |
| 6,185,184 B1 | 2/2001 | Mattaway et al. | |
| 6,310,946 B1 * | 10/2001 | Bauer et al. .............. 379/208.01 |
| 6,335,963 B1 | 1/2002 | Bosco | |
| 6,584,188 B2 | 6/2003 | Kim | |
| 6,678,719 B1 | 1/2004 | Stimmel | |
| 6,731,308 B1 | 5/2004 | Tang et al. | |
| 6,912,564 B1 | 6/2005 | Appelman et al. | |
| 6,996,217 B2 | 2/2006 | Goldman | |
| 6,999,962 B2 | 2/2006 | Julliard et al. | |
| 7,023,968 B1 | 4/2006 | Silvester | |

(Continued)

FOREIGN PATENT DOCUMENTS

EP  1 523 166 A1  4/2005

*Primary Examiner* — Joshua Joo
(74) *Attorney, Agent, or Firm* — Greenberg Traurig, LLP

(57) ABSTRACT

A method and a communication interchange enhancement system for implementing an enhanced user interface for a communication interchange includes but is not limited to a method including to providing an identifier associated with a third-party participant related to the communication interchange; matching the identifier with the third-party participant in a database storing one or more lists of possible third-party participants; obtaining context data associated with the identifier regarding a group-type characteristic of the third-party participant for purposes of communication interchange with at least another participant; and enabling a user interface to display the group-type characteristic.

27 Claims, 8 Drawing Sheets

(56) References Cited

U.S. PATENT DOCUMENTS

| | | |
|---|---|---|
| 7,072,450 B1 | 7/2006 | Pinard |
| 7,149,296 B2 | 12/2006 | Brown et al. |
| 7,299,257 B2 | 11/2007 | Boyer et al. |
| 7,533,146 B1 | 5/2009 | Kumar |
| 7,574,746 B2 | 8/2009 | Hill et al. |
| 7,624,188 B2 | 11/2009 | Koskelainen |
| 7,653,188 B2 | 1/2010 | Kloberdans et al. |
| 7,707,262 B1 | 4/2010 | Bill |
| 7,797,732 B2 | 9/2010 | Tam et al. |
| 7,873,996 B1 | 1/2011 | Emigh et al. |
| 7,925,702 B2 | 4/2011 | Rood et al. |
| 7,933,985 B2 | 4/2011 | Kurapati et al. |
| 7,945,034 B2 | 5/2011 | Gonen et al. |
| 8,015,414 B2 | 9/2011 | Mahone et al. |
| 8,040,875 B2 | 10/2011 | Barclay et al. |
| 2002/0044067 A1 | 4/2002 | Ilcisin |
| 2002/0049751 A1* | 4/2002 | Chen et al. ............... 707/3 |
| 2002/0076015 A1* | 6/2002 | Norwitz et al. ........... 379/93.09 |
| 2002/0183100 A1* | 12/2002 | Parker ..................... 455/566 |
| 2003/0046344 A1* | 3/2003 | Kumhyr et al. ........... 709/205 |
| 2003/0097449 A1* | 5/2003 | Derocher et al. .......... 709/227 |
| 2003/0112949 A1* | 6/2003 | Brown et al. ............. 379/207.14 |
| 2003/0125072 A1 | 7/2003 | Dent |
| 2003/0147519 A1 | 8/2003 | Jain et al. |
| 2003/0182371 A1 | 9/2003 | Worthen |
| 2004/0005904 A1* | 1/2004 | Wolf et al. ............... 455/519 |
| 2004/0019641 A1* | 1/2004 | Bartram et al. ........... 709/205 |
| 2004/0088286 A1 | 5/2004 | Hackleman et al. |
| 2004/0103147 A1 | 5/2004 | Flesher et al. |
| 2004/0117194 A9 | 6/2004 | Lee et al. |
| 2004/0254809 A1 | 12/2004 | Teicher |
| 2005/0086256 A1* | 4/2005 | Owens et al. ............. 707/103 R |
| 2005/0089023 A1 | 4/2005 | Barkley et al. |
| 2005/0097169 A1 | 5/2005 | Mukherjee et al. |
| 2005/0113076 A1 | 5/2005 | Lee |
| 2005/0160167 A1* | 7/2005 | Cheng et al. ............. 709/224 |
| 2005/0164720 A1 | 7/2005 | Huang |
| 2005/0181803 A1 | 8/2005 | Weaver et al. |
| 2005/0275715 A1* | 12/2005 | Shingu et al. ............. 348/14.07 |
| 2006/0004869 A1 | 1/2006 | Yuster et al. |
| 2006/0019689 A1* | 1/2006 | Pantalone et al. .......... 455/518 |
| 2006/0025167 A1 | 2/2006 | Chhatriwala et al. |
| 2006/0067502 A1* | 3/2006 | Bamrah et al. ............ 379/211.02 |
| 2006/0140200 A1 | 6/2006 | Black et al. |
| 2006/0222155 A1* | 10/2006 | Summers et al. .......... 379/202.01 |
| 2006/0227754 A1 | 10/2006 | Ko |
| 2006/0246934 A1* | 11/2006 | Patel et al. ............... 455/519 |
| 2007/0042763 A1 | 2/2007 | Yeh |
| 2007/0081648 A1 | 4/2007 | Abramson et al. |
| 2007/0121596 A1 | 5/2007 | Kurapati et al. |
| 2007/0133774 A1 | 6/2007 | Fujimoto |
| 2007/0156811 A1* | 7/2007 | Jain et al. ................. 709/204 |
| 2007/0172047 A1* | 7/2007 | Coughlan et al. .......... 379/202.01 |
| 2007/0204033 A1 | 8/2007 | Bookbinder et al. |
| 2007/0232285 A1* | 10/2007 | Lush et al. ................ 455/418 |
| 2007/0244807 A1 | 10/2007 | Andringa et al. |
| 2007/0263819 A1 | 11/2007 | Finkelman et al. |
| 2007/0264974 A1 | 11/2007 | Frank et al. |
| 2007/0288755 A1 | 12/2007 | Bryant |
| 2008/0005229 A1 | 1/2008 | Cohen et al. |
| 2008/0005236 A1* | 1/2008 | Schmieder ................ 709/204 |
| 2008/0005242 A1 | 1/2008 | Cohen et al. |
| 2008/0089501 A1 | 4/2008 | Benco et al. |
| 2008/0307306 A1 | 12/2008 | Pettinati et al. |
| 2009/0209241 A1* | 8/2009 | Karaoguz et al. .......... 455/415 |
| 2009/0316876 A1 | 12/2009 | Walsh et al. |
| 2011/0004939 A1 | 1/2011 | Cohen et al. |
| 2011/0004940 A1 | 1/2011 | Cohen et al. |
| 2011/0145570 A1 | 6/2011 | Gressel et al. |

\* cited by examiner

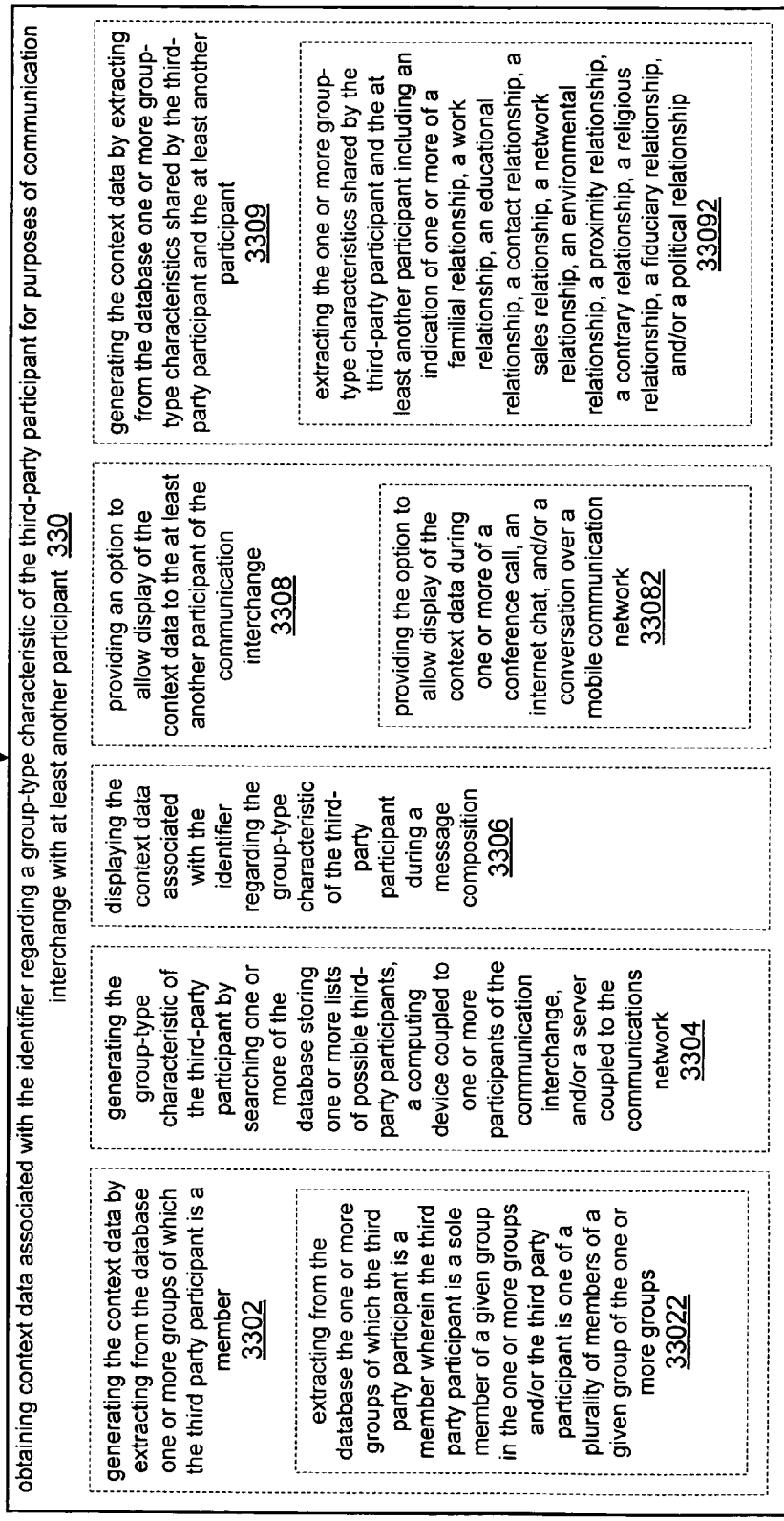

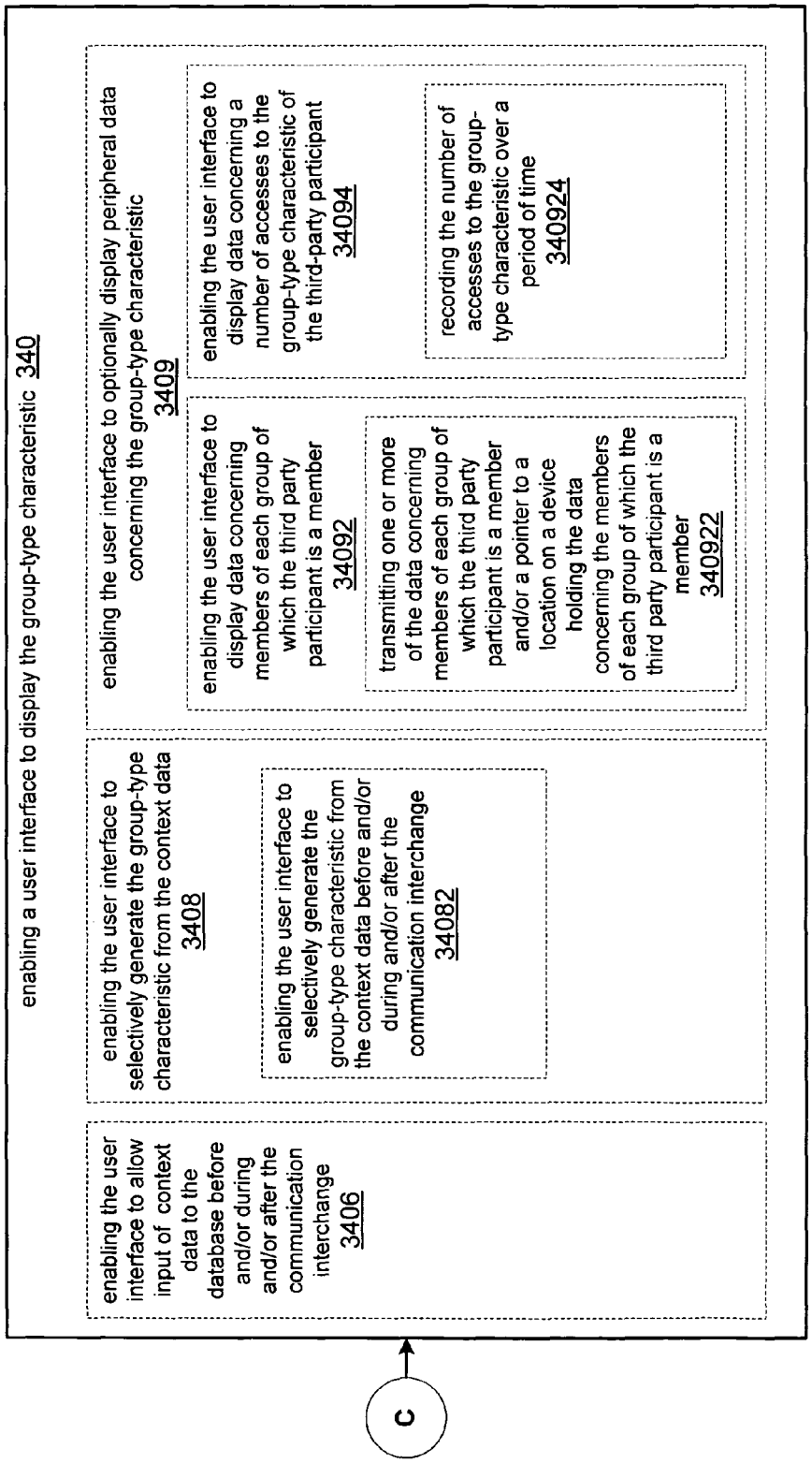

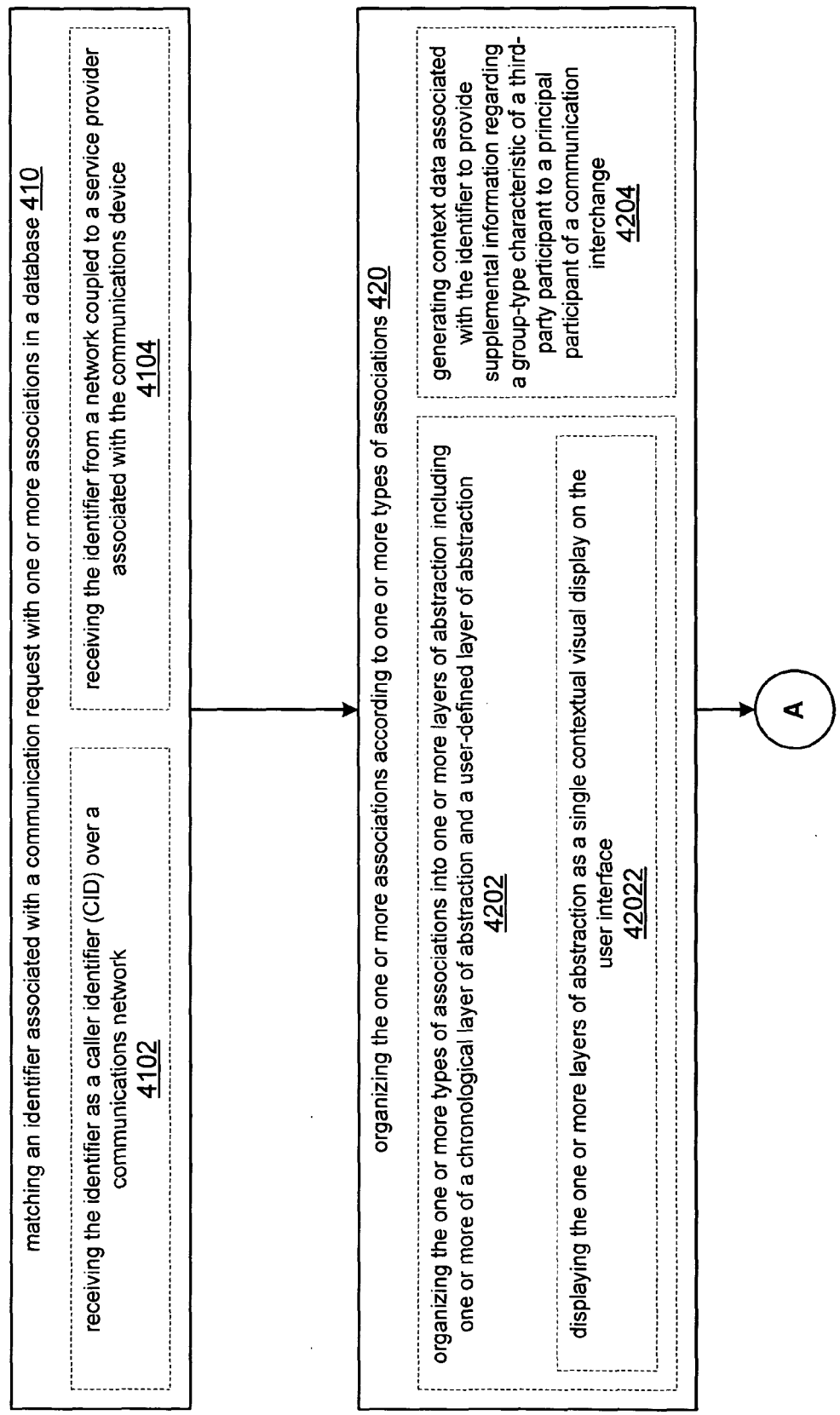

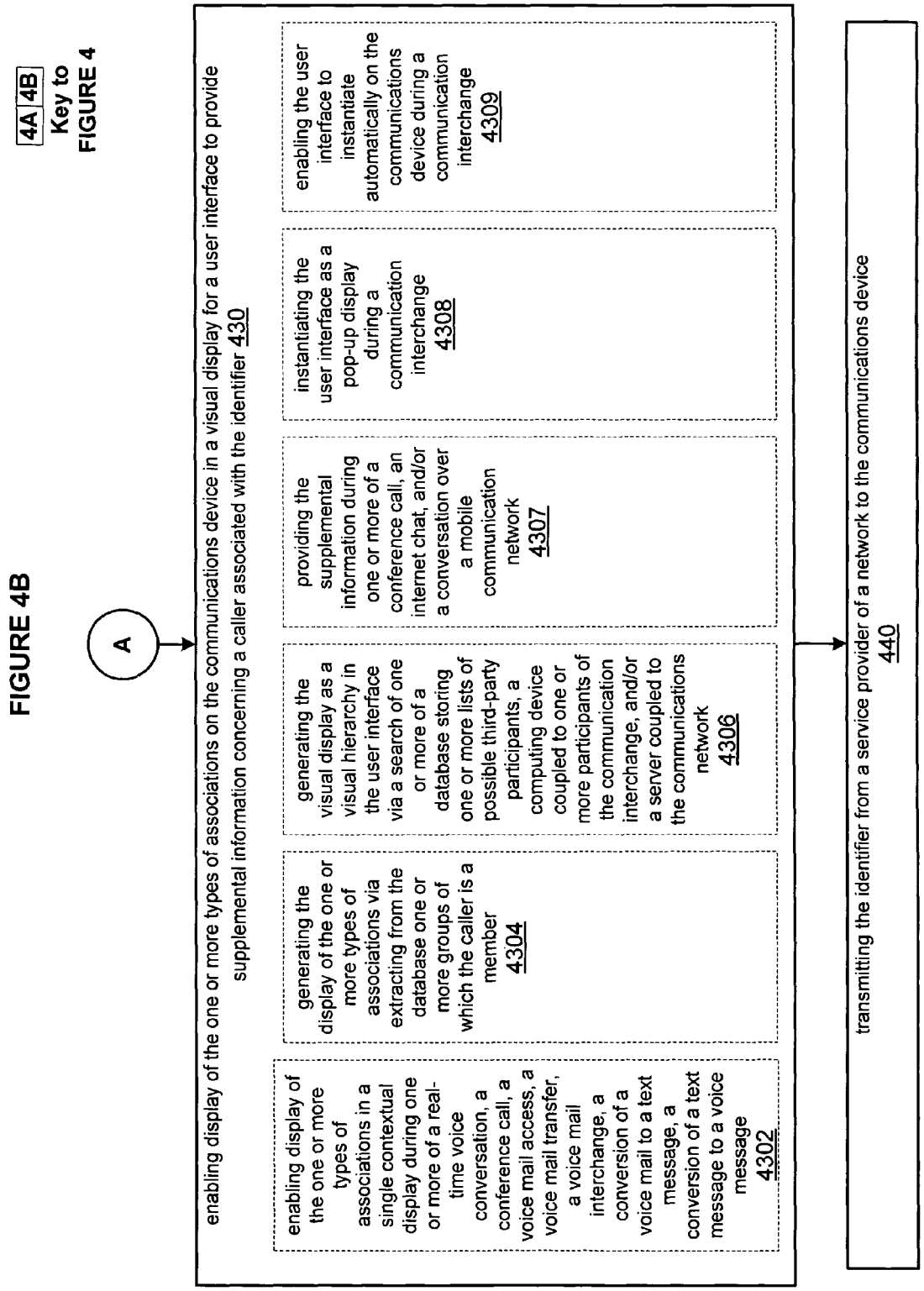

IDENTIFIER TECHNIQUE FOR COMMUNICATION INTERCHANGE

CROSS-REFERENCE TO RELATED APPLICATIONS

The present application is related to and claims the benefit of the earliest available effective filing date(s) from the following listed application(s) (the "Related Applications") (e.g., claims earliest available priority dates for other than provisional patent applications or claims benefits under 35 USC §119(e) for provisional patent applications, for any and all parent, grandparent, great-grandparent, etc. applications of the Related Application(s)).

RELATED APPLICATIONS

For purposes of the USPTO extra-statutory requirements, the present application constitutes a continuation-in-part of United States patent application entitled CONTEXT PARAMETERS AND IDENTIFIERS FOR COMMUNICATION, naming Alexander J. Cohen, Edward K. Y. Jung, Royce A. Levien, Robert W. Lord, Mark A. Malamud, William Henry Mangione-Smith, John D. Rinaldo, Jr., and Clarence T. Tegreene as inventors, filed 18 Aug. 2006, Ser. No. 11/506,415, which is currently co-pending, or is an application of which a currently co-pending application is entitled to the benefit of the filing date.

The United States Patent Office (USPTO) has published a notice to the effect that the USPTO's computer programs require that patent applicants reference both a serial number and indicate whether an application is a continuation or continuation-in-part. Stephen G. Kunin, Benefit of Prior-Filed Application, USPTO Official Gazette Mar. 18, 2003, available at http://www.uspto.gov/web/offices/com/sol/og/2003/week11/patbene.htm. The present applicant entity has provided above a specific reference to the application(s) from which priority is being claimed as recited by statute. Applicant entity understands that the statute is unambiguous in its specific reference language and does not require either a serial number or any characterization, such as "continuation" or "continuation-in-part," for claiming priority to U.S. patent applications. Notwithstanding the foregoing, applicant entity understands that the USPTO's computer programs have certain data entry requirements, and hence applicant entity is designating the present application as a continuation-in-part of its parent applications as set forth above, but expressly points out that such designations are not to be construed in any way as any type of commentary and/or admission as to whether or not the present application contains any new matter in addition to the matter of its parent application(s).

All subject matter of the Related Applications and of any and all parent, grandparent, great-grandparent, etc. applications of the Related Applications is incorporated herein by reference to the extent such subject matter is not inconsistent herewith.

BACKGROUND

The present application relates generally to various user interface features for communication interchanges.

SUMMARY

In one aspect, a method for implementing an enhanced user interface for a communication interchange includes but is not limited to providing an identifier associated with a third-party participant related to the communication interchange; matching the identifier with the third-party participant in a database storing one or more lists of possible third-party participants; obtaining context data associated with the identifier regarding a group-type characteristic of the third-party participant for purposes of communication interchange with at least another participant; and enabling a user interface to display the group-type characteristic. In addition to the foregoing, other method aspects are described in the claims, drawings, and text forming a part of the present application.

In another aspect, a method for a communications device includes but is not limited to matching an identifier associated with a communication request with one or more associations in a database; organizing the one or more associations according to one or more types of associations; and enabling display of the one or more types of associations on the communications device in a visual display for a user interface to provide supplemental information concerning a caller associated with the identifier. In addition to the foregoing, other method aspects are described in the claims, drawings, and text forming a part of the present application.

In another aspect, a computer program product includes but is not limited to a signal bearing medium bearing at least one of one or more instructions for providing an identifier associated with a third-party participant related to the communication interchange; one or more instructions for matching the identifier with the third-party participant in a database storing one or more lists of possible third-party participants; one or more instructions for obtaining context data associated with the identifier regarding a group-type characteristic of the third-party participant for purposes of communication interchange with at least another participant; and one or more instructions for enabling a user interface to display the group-type characteristic. In addition to the foregoing, other computer program product aspects are described in the claims, drawings, and text forming a part of the present application.

In another aspect, a computer program product includes but is not limited to a signal bearing medium bearing at least one of one or more instructions for one or more instructions for matching an identifier associated with a communication request with one or more associations in a database; one or more instructions organizing the one or more associations according to one or more types of associations; and one or more instructions enabling display of the one or more types of associations on the communications device in a visual display for a user interface to provide supplemental information concerning a caller associated with the identifier. In addition to the foregoing, other computer program product aspects are described in the claims, drawings, and text forming a part of the present application.

In another aspect, a communication interchange enhancement system includes but is not limited to a processor; a memory coupled to the processor; a database coupled to the processor, the database configured to store one or more associations and/or one or more types of associations and/or one or more lists of possible third-party participants of a communication interchange; a matching module coupled to the processor and the database, the matching module configured to match a received identifier with the one or more associations and/or the one or more types of associations, and/or the one or more lists of third party participants in the database; and an organizational module coupled to the processor, the organizational module configured to organize the one or more associations according to one or more group-type characteristics and/or types of associations in the database to enable a user interface to provide supplemental information concerning a caller associated with the received identifier.

In one or more various aspects, related systems include but are not limited to circuitry and/or programming for effecting the herein-referenced method aspects; the circuitry and/or programming can be virtually any combination of hardware, software, and/or firmware configured to effect the herein-referenced method aspects depending upon the design choices of the system designer. In addition to the foregoing, other system aspects are described in the claims, drawings, and text forming a part of the present application.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

A better understanding of the subject matter of the application can be obtained when the following detailed description of the disclosed embodiments is considered in conjunction with the following drawings, in which:

FIGS. 3A-3D illustrate a flow diagram of a method in accordance with an embodiment of the subject matter of the present application; and FIGS. 4A and 4B illustrate a flow diagram of a method in accordance with an embodiment of the subject matter of the present application.

DETAILED DESCRIPTION

Figure 1:
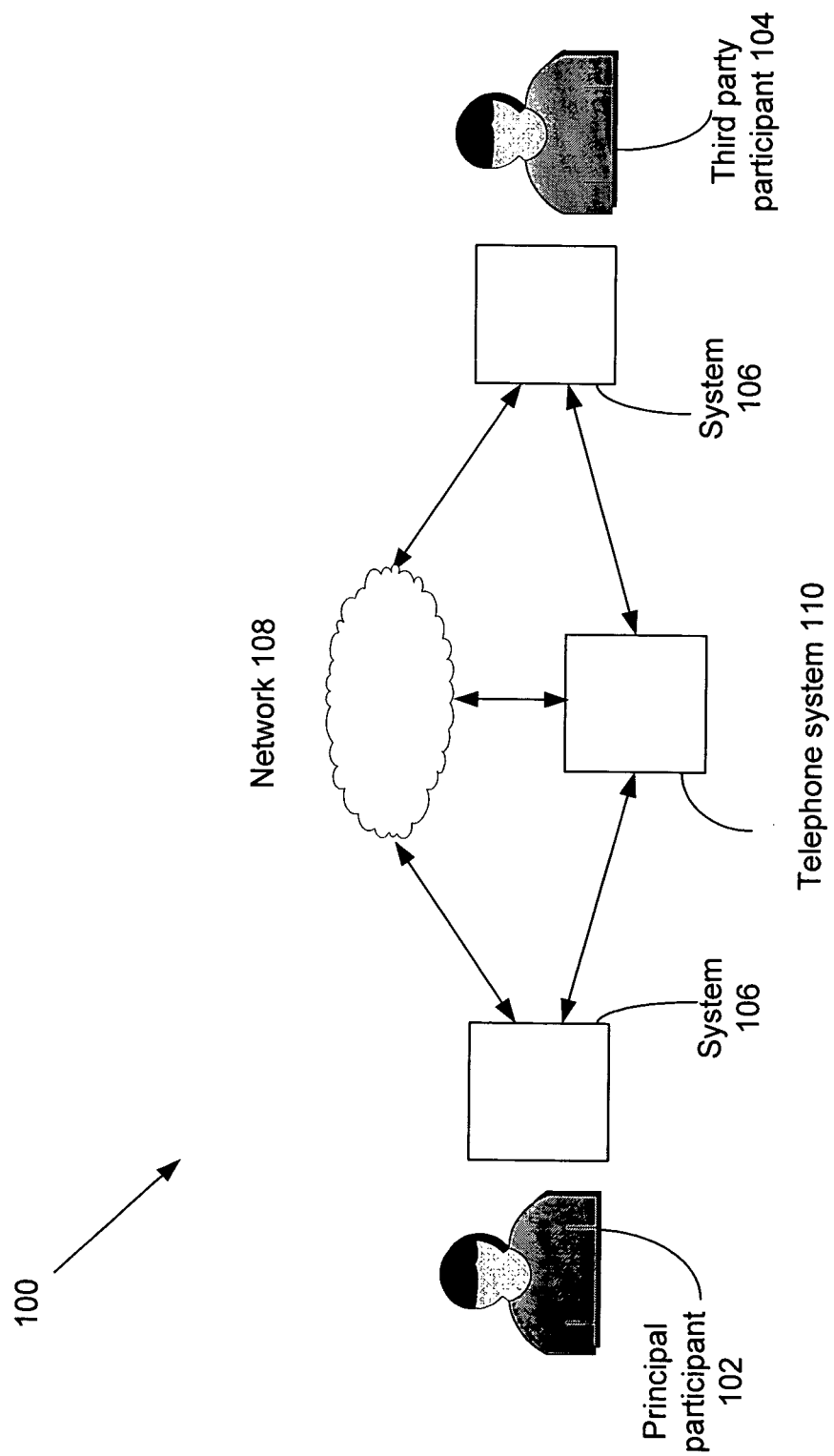
FIG. 1 depicts an exemplary environment in which the methods and systems described herein may be represented.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here.

In the description that follows, the subject matter of the application will be described with reference to acts and symbolic representations of operations that are performed by one or more computers, systems, telephone systems, mobile devices and the like unless indicated otherwise. As such, it will be understood that such acts and operations, which can be referred to as being computer-executed, include the manipulation by the processing unit of the computer of electrical signals representing data in a structured form. This manipulation transforms the data or maintains it at locations in the memory system of the computer which reconfigures or otherwise alters the operation of the computer in a manner well understood by those skilled in the art. The data structures where data is maintained can include physical locations of the memory that have particular properties defined by the format of the data. However, although the subject matter of the application is being described in the foregoing context, it is not meant to be limiting as those of skill in the art will appreciate that some of the acts and operations described hereinafter can also be implemented in hardware, software, and/or firmware and/or some combination thereof.

Referring now to FIG. 1, a block diagram depicts one or more exemplary environments in which the methods and systems described herein may be represented. Principal participant 102 may be a person and/or an entity capable of communicating with other persons and/or entities. The principal participant 102 may include but is not limited to a single person, a group of two or more persons associated for the purpose of a communication (e.g., a group of three persons communicating with another person and/or group of persons to arrange a meeting), and/or one or more persons of a group of persons associated for one or more purposes or reasons (e.g., an employee or employees of a corporation, or members of a family) some or all of whom may participate in a communication on behalf of the association.

Third party participant 104 may be a person and/or an entity capable of communicating with other persons and/or entities. Third party participant 104 may include but is not limited to a single person, a group of two or more persons associated for the purpose of a communication (e.g., a group of three persons communicating with another person and/or group of persons to arrange a meeting), and/or one or more persons of a group of persons associated for one or more purposes or reasons (e.g., an employee or employees of a corporation, or members of a family), some or all of whom may participate in a communication on behalf of the association.

A communication or other event may take place between the principal participant 102 and the third party participant 104 that prompts the principal participant 102 to define a communications context for communications with the third party participant 104. Such communication may take place using means including but not limited to telephony (using the public switched telephone system, the internet (e.g., Voice over Internet Protocol), satellite communication systems, instant and/or text messaging, and/or electronic mail ("email"). Systems 106 represent any systems comprising one or more communications devices, including but not limited to a telephone, a Voice over Internet Protocol ("VoIP") endpoint, a computer running email and/or instant messaging software, and/or a personal digital assistant and/or a cell phone running text messaging software. The systems 106 are illustrated in the exemplary environment 100 in close physical proximity to the principal participant 102 and the third party participant 104. Those skilled in the art will appreciate that one or more of the devices included in the systems 106 may be relatively distant but operably coupled to one or more devices included in the systems 106 and in physical proximity to the respective entities with which the systems 106 are associated (principal participant 102 and the third party participant 104). The systems 106 may be operably coupled via the internet, represented in the exemplary environment 100 by the network 108, or by other communication links represented by the telephone system 110, or by some combination of the network 108 and the telephone system 110. The operable couplings between the systems 106 may be physical connections, e.g., wires and/or cables and/or fiber-optic lines, or wireless connections, e.g., radio-frequency connections between cell phone and cell network towers, satellite towers and/or some combination of physical connections and wireless connections.

Figure 2:
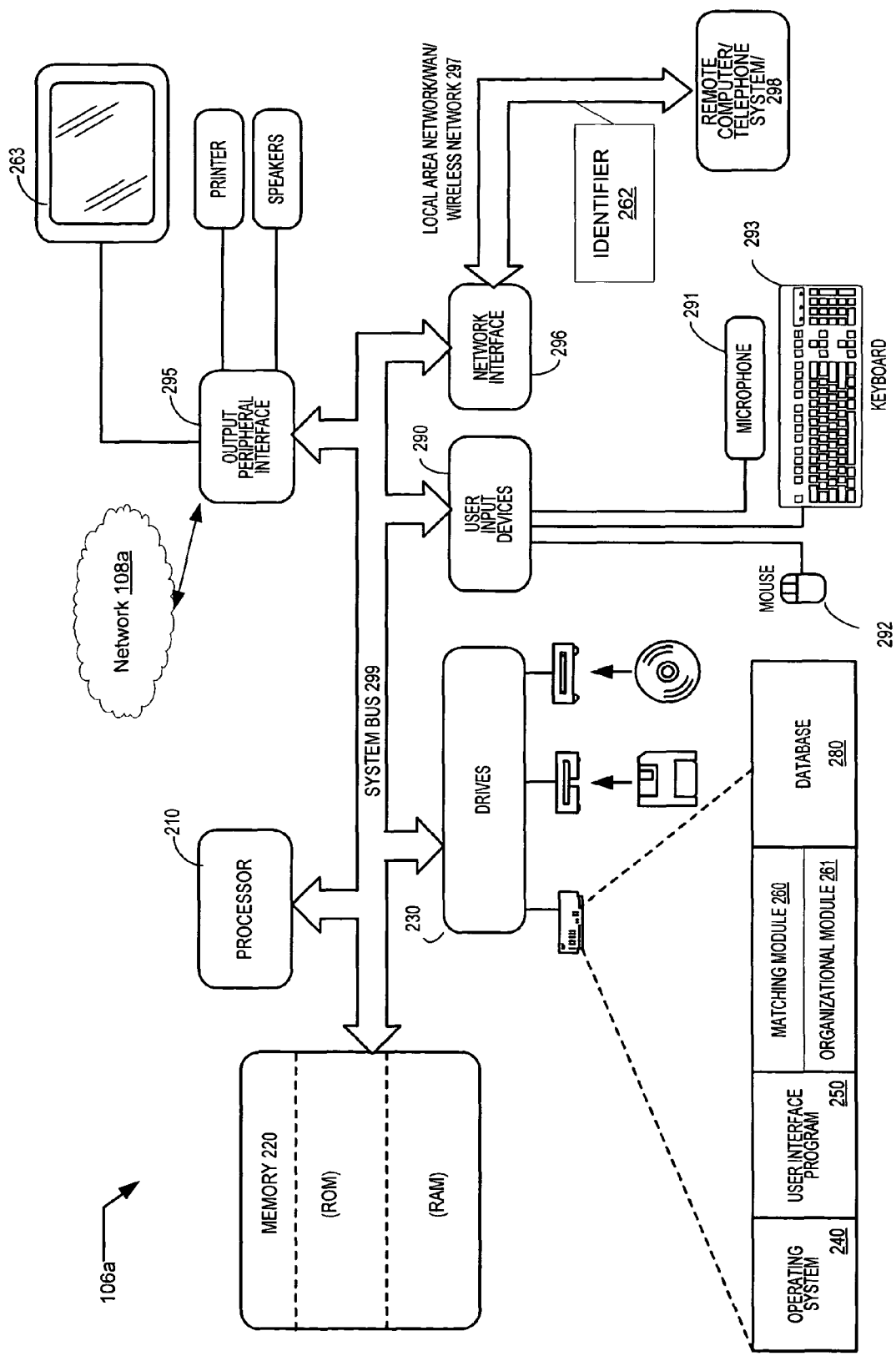
FIG. 2 is a block diagram of an exemplary computer architecture that supports the claimed subject matter of the present application.

With reference to FIG. 2, depicted is a computing system 106a which could be a computer configured as one of the systems 106 depicted in FIG. 1, a server coupled to other systems 106, or a communication device. Computer 106 could be configured as a server for a network provider or as a communication device as described below. FIG. 2 includes a computer system 106, including a processor 210, memory 220 and one or more drives 230. The drives 230 and their associated computer storage media, provide storage of computer readable instructions, data structures, program modules and other data for computer system 106. Drives 230 can include an operating system 240, user interface program 250, matching module 260 and organizational module 261, and database 280. Computer system 106 further includes user input devices 290 through which a user may enter commands and data. Input devices can include a microphone 291, a keyboard 293, and pointing device, commonly referred to as a mouse 292. Other input devices may include an electronic digitizer, a trackball, a touch pad, a joystick, a game pad, a satellite dish, a scanner, or the like.

These and other input devices can be connected to processor 210 through a user input interface such as user input devices 290 that is coupled to a system bus 299, but may be connected by other interface and bus structures, such as a parallel port, a game port or a universal serial bus (USB) or network interface 296. Computers such as computer system 106 may also include other peripheral output devices such as display 263 and speakers, which may be connected through an output peripheral interface 295 or the like. More particularly, output devices can include personal digital assistant type devices networked to computer system 106 to enable on-the-fly functional assistance. In one embodiment, display 263 is incorporated into a communication/telephone device. In another embodiment, computer system 106 functions primarily as a communication/telephone device.

Computer system 106 may operate in a networked environment 108a such as network 108 shown in FIG. 1 using logical connections to one or more computers, such as a remote computer 298 connected to network interface 296 via network 297. Remote computer 298 may be a personal computer, a server, a router, a network PC, a peer device or other common network node, and/or a remote telephone system, such as telephone system 110 shown in FIG. 1, and can include many or all of the elements described above relative to computer system 106. Networking environments are commonplace in offices, enterprise-wide computer networks, intranets and the Internet. For example, in the subject matter of the present application, computer system 106 may comprise the source machine from which data is being migrated, and the remote computer may comprise the destination machine. Note however, that source and destination machines need not be connected by a network or any other means, but instead, data may be migrated via any media capable of being written by the source platform and read by the destination platform or platforms. When used in a local area network (hereinafter referred to as "LAN") or a wide area network (hereinafter referred to as "WAN") networking environment, computer system 106 is connected to the LAN through a network interface 296 or an adapter. When used in a WAN networking environment, computer system 106 typically includes a modem or other means for establishing communications over the WAN, such as the Internet. It will be appreciated that other means of establishing a communications link between the computers may be used.

Following are a series of flowcharts depicting implementations of processes. For ease of understanding, the flowcharts are organized such that the initial flowcharts present implementations via an overall "big picture" viewpoint and thereafter the following flowcharts present alternate implementations and/or expansions of the "big picture" flowcharts as either sub-steps or additional steps building on one or more earlier-presented flowcharts. Those having skill in the art will appreciate that the style of presentation utilized herein (e.g., beginning with a presentation of a flowchart(s) presenting an overall view and thereafter providing additions to and/or further details in subsequent flowcharts) generally allows for a rapid and easy understanding of the various process implementations. In addition, those skilled in the art will further appreciate that the style of presentation used herein also lends itself well to modular and/or object-oriented program design paradigms.

Figure 3A:
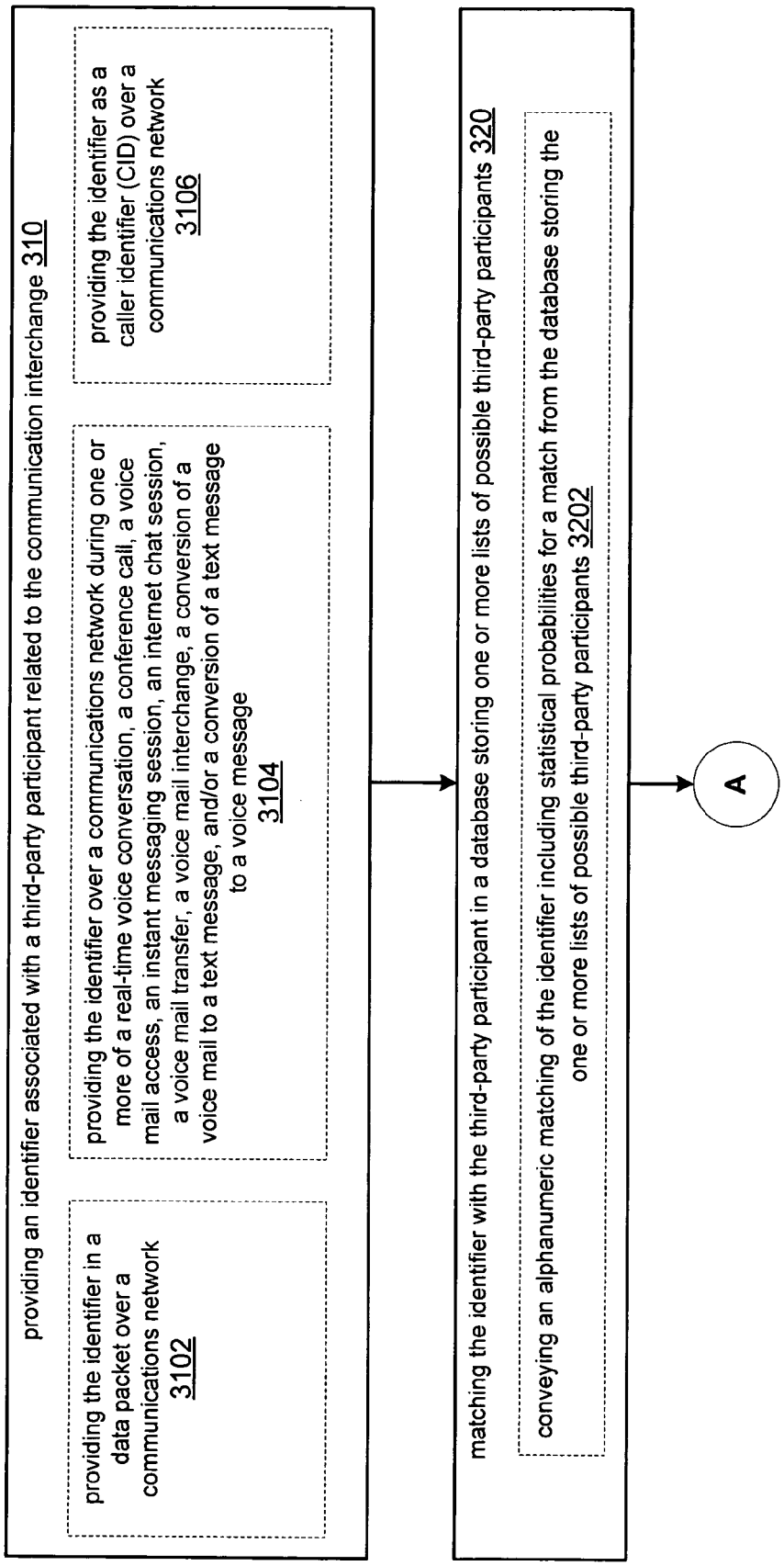
Figure 3C:
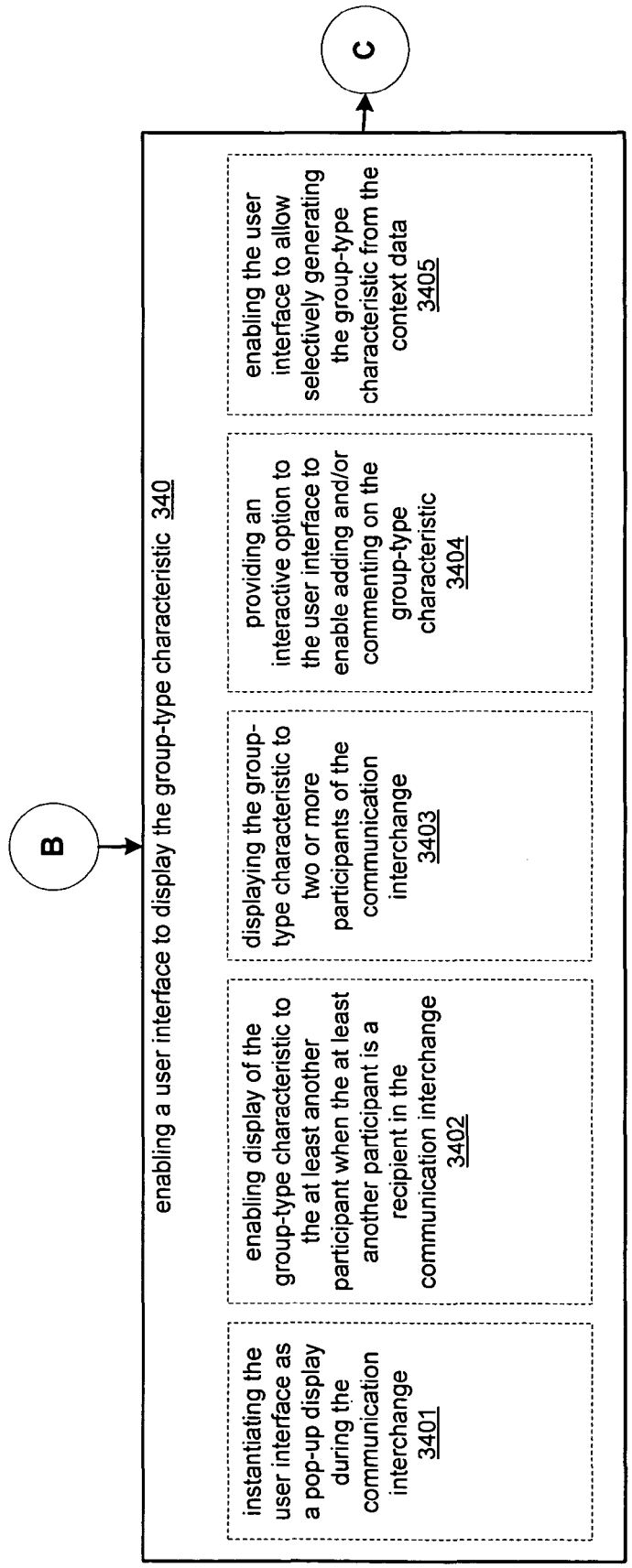

Referring now to FIG. 3, an exemplary flow diagram illustrates a method in accordance with an embodiment for a communication interchange. Block 310 provides for providing an identifier associated with a third-party participant related to the communication interchange (e.g., system 106, network 108, or telephone system 110 providing an identifier related to a communication interchange). For example, a caller associated with a communication interchange could transmit an identifier identifying himself. The identifier could be passed prior to a full connection to the communication interchange or during depending on system specifics of the caller.

Depicted within block 310 is optional block 3102 which provides for providing the identifier in a data packet over a communications network (e.g. an identifier 262 passing through network 297). An identifier could be embedded in an asynchronous transfer mode (ATM) data packet over a telephone system, or embedded in a data packet for a wireless protocol or the like.

Depicted within block 310 is optional block 3104, which provides for providing the identifier over a communications network during one or more of a real-time voice conversation, a conference call, a voice mail access, an instant messaging session, an internet chat session, a voice mail transfer, a voice mail interchange, a conversion of a voice mail to a text message, and/or a conversion of a text message to a voice message, (e.g. network 297 supplying identifier 262 during a communication interchange). The communication interchange can be over a communication network that supports conferencing, instant messaging, text to voice conversion and the like such that the identifier can be provided to a system such as system 106 during one of many types of communication interchanges.

Further depicted within block 310 is optional block 3106 which provides for providing the identifier as a caller identifier (CID) over a communications network (e.g., communication network 297 providing identifier 262 as a CID type identifier). For example, a telephone system can include the ability to transmit and receive caller identification. Embodiments herein can use the CID identifier.

Block 320 is coupled to block 310 and provides for matching the identifier with the third-party participant in a database storing one or more lists of possible third-party participants, (e.g., matching identifier 262 in matching module 260 one or more associations in database 280). The matching module 260 can be configured to work with database 280 to enable received identifiers 262 to be parsed to find the associations.

Depicted within block 320 is optional block 3202 with provides for conveying an alphanumeric matching of the identifier including statistical probabilities for a match from the database storing the one or more lists of possible third-party participants (e.g., system 106 conveying an alphanumeric matching using matching module 260 and database 280). In one embodiment, the matching module 260 performs an alphanumeric matching such that associations are found in database 280 by locating matching names and/or numbers received via identifier 262.

Block 320 is coupled to block 330 which provides for obtaining context data associated with the identifier regarding a group-type characteristic of the third-party participant for purposes of communication interchange with at least another participant (e.g., system 106 obtaining context data associated with identifier 262 regarding group-type characteristics of third party participant 104 for a communication interchange with principal participant 102). In one embodiment, the system 106 can be a telephone system operated by a principal participant. For example, principal participant 102 could determine whether or not to participate in a communication interchange according to information concerning groups in which the third-party participant is a member.

Depicted within block 330 is optional block 3302, which provides for generating the context data by extracting from the database one or more groups of which the third party participant is a member (e.g. system 106 generating the context data by extracting from database 280 one or more groups of which the third-party participant is a member by using matching module 260). Depicted within block 3302 is optional block 33022 which provides for extracting from the database the one or more groups of which the third party participant is a member wherein the third party participant is a sole member of a given group in the one or more groups and/or the third party participant is one of a plurality of members of a given group of the one or more groups (e.g., database 280 and matching module 260 extracting the one or more groups and determining that the third-party participant is a sole member, or one of many members of a group identified in database 280). For example, if a potential caller (third-party participant 104) contacts another party within an organization, the receiving party (principal participant 102) can determine the nature of the call by first finding groups within the organization with which the caller is a member. The group can be a department within the organization, such as accounting, payroll, benefits, human resources, or the like. The information on the group to which the caller belongs can therefore assist the receiving party in determining, for example, the importance of the call.

Depicted within block 330 is optional block 3304 which provides for generating the group-type characteristic of the third-party participant by searching one or more of the database storing one or more lists of possible third-party participants, a computing device coupled to one or more participants of the communication interchange, and/or a server coupled to the communications network (e.g., system 106 generating the group-type characteristic of the third-party participant 104 by searching database 280, searching another system 106 coupled via network 108, searching telephone system 110, and/or searching a system 106 configured as a server).

Block 330 also includes optional block 3306 which provides for displaying the context data associated with the identifier regarding the group-type characteristic of the third-party participant during a message composition (e.g., display 263 displaying the context data supplied by database 280). The display 263 can be incorporated into a telephone, or can be part of a digital assistant coupled to a communication device over a wireless connection or the like. Thus, during a communication interchange, the context data can be transmitted to a device for display that is not directly coupled to a telephone or other device that a principal participant is operating.

Block 330 includes optional block 3308 which provides for providing an option to allow display of the context data to the at least another participant of the communication interchange (e.g., system 106 providing an option via processor 210 and either or both of network 108 and telephone system 110 to transmit and permit display of the context data for other participants to a communication interchange, such as another third-party participant 104). In some instances, the context data could provide information regarding a caller that each of the third-party participants to a communication interchange should know about. For example, if time is of the essence with regard to a decision pertaining to a third-party participant, sharing the information concerning context data of a caller could be paramount. In one embodiment, therefore, system 106 provides near real-time transmission of the context data to any other participants chosen by the primary participant to the communication interchange.

Within optional block 3308 is optional block 33082 which provides for providing the option to allow display of the context data during one or more of a conference call, an internet chat, and/or a conversation over a mobile communication network (e.g., system 106 providing an option via processor 210 and either or both of network 108 and telephone system 110 to transmit and allow display of the context data during the communication interchange, such as during a conference call, chat session or over a mobile network, such as a mobile phone). For example, if system 106 is coupled to a display over output peripheral interface 295 directly or over a network such as network 108 or the like, the context data could be provided to different types of communication interchanges. Additionally, if the principal participant 102 is involved in a conference call, system 106 can provide information to the principal participant 102 during the conference to enable the principal participant 102 to make a decision concerning adding the third-party participant 104 to the conference.

Block 330 also depicts optional block 3309 within block 330. Block 3309 provides for generating the context data by extracting from the database one or more group-type characteristics shared by the third-party participant and the at least another participant (e.g., system 106 generating the context data using database 280 and matching module 260 to determine which group-type characteristics are shared by the third-party participant 104 and another participant). For example, during a conference call, principal participant 102 could receive a call and could direct an assistant or the like to only allow those calls that share a group-type characteristic to interrupt the conference call. Depicted within block 3309 is optional block 33092 which provides for extracting the one or more group-type characteristics shared by the third-party participant and the at least another participant including an indication of one or more of a familial relationship, a work relationship, an educational relationship, a contact relationship, a sales relationship, a network relationship, an environmental relationship, a proximity relationship, a contrary relationship, a religious relationship, a fiduciary relationship, and/or a political relationship (e.g., system 106 and matching module 260 extracting from database 280 which group-type characteristics are shared by the third-party participant 104 and another participant to determine what kind of relationship a caller might have to the principal participant 102). For example, the database could have context data concerning a caller that includes a plurality of different relationships a caller could have to the principal participant 102. Each of the relationships could be identified and displayed for use by the principal participant 102.

Block 340 is illustrated coupled to block 330. Block 340 provides for enabling a user interface to display the group-type characteristic (e.g., user interface program 250 and processor 210 enabling output peripheral interface 295 to display on display 263 the group-type characteristics determined in database 280 and matching module 260).

Depicted within block 340 is optional block 3401 which provides for instantiating the user interface as a pop-up display during the communication interchange (e.g., system 106 and user interface program 250 enabling display 263 to display the context data in a pop-up display). For example, in one embodiment, the system 106 is a service provider that sends data across output peripheral interface 295 to users coupled via a network such as network 108 or the like. Alternatively, display 263 is coupled directly to system 106 such that the pop-up display occurs without a network connection.

Also depicted within block 340 is optional block 3402 which provides for enabling display of the group-type characteristic to the at least another participant when the at least another participant is a recipient in the communication interchange (e.g., enabling output peripheral interface 295 to display on display 263 the group-type characteristics determined in database 280 and matching module 260). In an embodiment, the determination of the group-type characteristic can be performed on a system 106 that receives the identifier 262, and passes the group-type characteristic to another system 106 or to a display coupled to a system 106.

Also depicted within block 340 is optional block 3403, which provides for displaying the group-type characteristic to two or more participants of the communication interchange (e.g., display 263 displaying the group-type characteristic of two or more participants such as primary participant 102 and third party participant 104).

Block 340 further includes optional block 3404, which provides for providing an interactive option to the user interface to enable adding and/or commenting on the group-type characteristic (e.g., user interface program 250 including an interactive option to enable adding and/or commenting on the group-type characteristic determined in matching module 260).

Block 340 further includes optional block 3405, which provides for enabling the user interface to allow selectively generating the group-type characteristic from the context data (e.g., providing that user interface program 250 allow a primary participant 102 to selectively generate the group-type characteristic determined from database 280). For example, a primary participant 102 could be interesting in certain types of callers to an ongoing conference or the like. If the primary participant 102 is only interested in people who are members of particular group, then a filter could be applied to only display on the user interface program 250 only context data concerning callers that belong to that particular group.

Block 340 further includes optional block 3406 which provides for enabling the user interface to allow input of context data to the database before and/or during and/or after the communication interchange (e.g., enabling user interface program 250 to allow another participant, such as third party participant 104 to input new context data into database 280 before, during or after a communication interchange). For example, a caller to a principal participant 102 could be missing from database 280 and denied an opportunity to participate in an instant messaging session, conference call or the like and therefore would like to add his data to the database to prevent such an occurrence from repeating. By adding context data relevant to a communication interchange with the principal participant 102, a third party participant 104 could be allowed in a later or current interchange.

Also depicted within block 340 is optional block 3408 which provides for enabling the user interface to selectively generate the group-type characteristic from the context data (e.g., enabling user interface program 250 to allow principal participant 102 to be selective in interacting with group-type characteristics generated with database 280). For example, a caller could be a member of a plurality of groups about which the principal participant 102 has no interest. Being selective, principal participant 102 could determine which callers to accept calls from based on the selected group-type characteristic.

Depicted within block 3408 is optional block 34082, which provides for enabling the user interface to selectively generate the group-type characteristic from the context data before and/or during and/or after the communication interchange (e.g., user interface program 250 allowing principal participant 102 to selectively determine which group-type characteristics generated with database 280 should be displayed or passed to other participants before, during or after a communication interchange).

Block 340 further depicts optional block 3409 which provides for enabling the user interface to optionally display peripheral data concerning the group-type characteristic (e.g., user interface program 250 displaying on display 263 peripheral data concerning the group-type characteristic generated from database 280). Block 3409 depicts optional block 34092 which provides for enabling the user interface to display data concerning members of each group of which the third party participant is a member (e.g., user interface program 250 enabling display 263 to display data concerning peripheral data that includes displaying names of members of groups of which the third party participant is a member). Block 34092 further depicts optional block 340922 which provides for transmitting one or more of the data concerning members of each group of which the third party participant is a member and/or a pointer to a location on a device holding the data concerning the members of each group of which the third party participant is a member (e.g., transmitting over network interface 296 data concerning the members of the group to which the third party participant 104 is a member, and/or transmitting over network interface 296 a pointer or pointer location on another system 106 a location, such as a location in database 280 where the data concerning the members of the group is located). For example, a database 280 in system 106 may have data that relates to member data in another database networked to system 106. According to an embodiment, the data in database 280 can be provided to a participant that is connected with another telephone system or system 106 networked to system 106.

Also depicted in block 3409 is optional block 34094 which provides for enabling the user interface to display data concerning a number of accesses to the group-type characteristic of the third-party participant (e.g., the peripheral data concerning the group-type characteristic could include a number of accesses to the database 280 where the group-type characteristic could be stored). Depicted in block 34094 is optional block 340924 which provides for recording the number of accesses to the group-type characteristic over a period of time (e.g., processor 210 recording using database 280 a number of accesses to the group-type characteristic over a period of time). For example, the database could hold a counter to keep track of the number of accesses to the group-type characteristic determined for each identifier received and operated on by matching module 260.

Referring now to FIG. 4, a flow diagram illustrates a method for a communications device. The communications device could include one of a system 106, illustrated in FIG. 1 and FIG. 2, or alternatively could be a device coupled to output peripheral interface 295. Block 410 provides for matching an identifier associated with a communication request with one or more associations in a database (e.g., system 106, network 108, or telephone system 110 matching in matching module 260 the identifier 262 with association in database 280). Block 410 depicts optional blocks 4102 and 4104 therein. Block 4102 provides for receiving the identifier as a caller identifier (CID) over a communications network (system 106 receiving identifier 262 as a CID over network 297). Block 4104 provides for receiving the identifier from a network coupled to a service provider associated with the communications device (e.g., network controller 210 cooperating with a service provider or including a service provider to receive the indication via network 220).

Block 420 is coupled to block 410 and provides for organizing the one or more associations according to one or more types of associations (e.g., organizational module 261 organizing the one or more types of associations in database 280). Depicted within block 420 is optional block 4202 which provides for organizing the one or more types of associations into one or more layers of abstraction including one or more of a chronological layer of abstraction and a user-defined layer of abstraction (e.g., organizational module 261 organizing the one or more associations in database 280 into layers of abstraction that include a chronological layer and a user-defined layer). For example, the database 280 could provide to organizational module 261 data that requires further parsing to enable a user interface such as user interface program 250 to provide useful data. Layers of abstraction can further organize associations by data or by another defined method according to user preference. Depicted within block 4202 is optional block 42022 which provides for displaying the one or more layers of abstraction as a single contextual visual display on the user interface (e.g., display 263 displaying the layers of abstraction as a single visual display via user interface program 250). In an embodiment, display 263 can display the different layers of abstraction as a single visual display by interfacing via output peripheral interface 295 providing display requirements to user interface program 250.

Block 420 further includes optional block 4204 which provides for generating context data associated with the identifier to provide supplemental information regarding a group-type characteristic of a third-party participant to a principal participant of a communication interchange (e.g., processor 210 operating with database 280 using organizational module 261 and/or matching module 260 to generate context data associated with identifier 262 to provide supplemental information regarding a group-type characteristic of third-party participant 104 to principal participant 102 during a communication interchange).

Block 420 is coupled to block 430 which provides for enabling display of the one or more types of associations on the communications device in a visual display for a user interface to provide supplemental information concerning a caller associated with the identifier (e.g., display 263 displaying one or more types of associations determined for identifier 262 via user interface program 250 operating with supplemental information concerning a caller, such as third party participant 104). User interface program 250 can enable display 263 to provide the supplemental information upon a determination of the one or more types of associations associated with identifier 262. For example, when a caller transfers an identifier as a CID or other format, the identifier is provided to organizational module 261 and matching module 260 to perform matching and to determine the one or more types of associations. The associations can be determined to be supplemental information concerning a caller appropriate for display. The supplemental information can then be displayed via user interface program 250 on display 263.

Depicted within block 430 is optional block 4302 which provides for enabling display of the one or more types of associations in a single contextual display during one or more of a real-time voice conversation, a conference call, a voice mail access, a voice mail transfer, a voice mail interchange, a conversion of a voice mail to a text message, a conversion of a text message to a voice message (e.g., user interface program 250 enabling display on display 263 of the one or more types of associations in the single contextual display during one or more of a real-time voice conversation, a conference call, a voice mail access, a voice mail transfer, a voice mail interchange, a conversion of a voice mail to text message, a conversion of a text message to a voice message).

Depicted within block 430 is also optional block 4304 which provides for generating the display of the one or more types of associations via extracting from the database one or more groups of which the caller is a member (e.g., user interface program 250 generating a single contextual display 263 via extracting from database 280 the one or more groups for which third-party participant 104 is a member).

Also depicted within block 430 is optional block 4306 which provides for generating the visual display as a visual hierarchy in the user interface via a search of one or more of a database storing one or more lists of possible third-party participants, a computing device coupled to one or more participants of the communication interchange, and/or a server coupled to the communications network (user interface program 250 generating a single contextual display 263 as a visual hierarchy via processor 210 and organizational module 261 performing a search of database 280, and database 280 storing one or more lists of possible third-party participants 104, and/or performing a search of a computing device 106 coupled to one or more participants of the communication interchange, and/or a server 106 coupled to the communications network 297).

Also depicted within block 430 is optional block 4307 which provides for providing the supplemental information during one or more of a conference call, an internet chat, and/or a conversation over a mobile communication network (e.g., communications network 297 and/or system 106 and/or user interface program 250 providing the supplemental information generated to principal participant 102 during a communication interchange). For example, principal participant 102 can be partaking in a communication interchange and user interface program 250 can provide the supplemental information by enabling a visual display of the supplemental information.

Also depicted in block 430 is optional block 4308 which provides for instantiating the user interface as a pop-up display during a communication interchange (e.g., processor 210 instantiating user interface program 250 to display a pop-up display of the supplemental information on display 263 during a communication interchange). The pop-up display could be for principal participant 102 and/or another participant such as third-party participant 104 during the communication interchange.

Also depicted in block 430 is optional block 4309 which provides for enabling the user interface to instantiate automatically on the communications device during a communication interchange (e.g., processor 210 operating with user interface program 250 to instantiate automatically on a communications device 106 or other device during a communication interchange).

Coupled to block 430 is block 440 which provides for transmitting the identifier from a service provider of a network to the communications device (e.g., network 297 transmitting identifier 262 to system 106 from a service provider, such as telephone system 110). For example, in an embodiment, identifier 262 could be received over a network from a service provider to system 106 when system 106 is functioning as a communications device.

Those with skill in the computing arts will recognize that the disclosed embodiments have relevance to a wide variety of applications and architectures in addition to those described above. In addition, the functionality of the subject matter of the present application can be implemented in software, hardware, or a combination of software and hardware. The hardware portion can be implemented using specialized logic; the software portion can be stored in a memory or recording medium and executed by a suitable instruction execution system such as a microprocessor.

While the subject matter of the application has been shown and described with reference to particular embodiments thereof, it will be understood by those skilled in the art that the foregoing and other changes in form and detail may be made therein without departing from the spirit and scope of the subject matter of the application, including but not limited to additional, less or modified elements and/or additional, less or modified blocks performed in the same or a different order.

Those having skill in the art will recognize that the state of the art has progressed to the point where there is little distinction left between hardware and software implementations of aspects of systems; the use of hardware or software is generally (but not always, in that in certain contexts the choice between hardware and software can become significant) a design choice representing cost vs. efficiency tradeoffs. Those having skill in the art will appreciate that there are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware. Hence, there are several possible vehicles by which the processes and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations will typically employ optically-oriented hardware, software, and or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and/or firmware would be well within the skill of one skilled in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link, etc.)

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality, and any two components capable of being so associated can also be viewed as being "operably couplable," to each other to achieve the desired functionality. Specific examples of operably couplable include but are not limited to physically mateable and/or physically interacting components and/or wirelessly interactable and/or wirelessly interacting components and/or logically interacting and/or logically interactable components.

Those skilled in the art will recognize that it is common within the art to implement devices and/or processes and/or systems in the fashion(s) set forth herein, and thereafter use engineering and/or business practices to integrate such implemented devices and/or processes and/or systems into more comprehensive devices and/or processes and/or systems. That is, at least a portion of the devices and/or processes and/or systems described herein can be integrated into comprehensive devices and/or processes and/or systems via a reasonable amount of experimentation. Those having skill in the art will recognize that examples of such comprehensive devices and/or processes and/or systems might include—as appropriate to context and application—all or part of devices and/or processes and/or systems of (a) an air conveyance (e.g., an airplane, rocket, hovercraft, helicopter, etc.), (b) a ground conveyance (e.g., a car, truck, locomotive, tank, armored personnel carrier, etc.), (c) a building (e.g., a home, warehouse, office, etc.), (d) an appliance (e.g., a refrigerator, a washing machine, a dryer, etc.), (e) a communications system (e.g., a networked system, a telephone system, a Voice over IP system, etc.), (f) a business entity (e.g., an Internet Service Provider (ISP) entity such as Comcast Cable, Quest, Southwestern Bell, etc.); or (g) a wired/wireless services entity such as Sprint, Cingular, Nextel, etc.), etc.

Furthermore, it is to be understood that the invention is defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

We claim:

1. A method for implementing an enhanced user interface for a communication interchange, the method comprising:
    providing an identifier associated with a third-party participant related to the communication interchange;
    matching the identifier with the third-party participant in a database storing one or more lists of possible third-party participants;
    obtaining context data associated with the identifier regarding a group-type characteristic of the third-party participant;
    enabling or interrupting a communication interchange between the third-party participant and at least another participant based on the obtained context data;
    transmitting one or more data to a first device for the purpose of displaying the group-type characteristic of the third-party participant to at least another participant, and transmitting one or more data to one or more second devices for the purpose of displaying the group-type characteristic of the third-party participant to one or more additional participants; and
    enabling a user interface of the first device and of the one or more second devices to display the group-type characteristic of the third-party participant including at least:
        enabling the user interface of the first device and of the one or more second devices to selectively generate the group-type characteristic from the context data, the group-type characteristic indicating to the at least another participant and the one or more additional participants one or more characteristics of the third-party participant to enable the at least another participant and the one or more additional participants to determine whether to engage in the communications interchange with the third-party participant.

2. The method of claim 1, wherein the providing an identifier associated with a third-party participant related to the communication interchange includes:
    providing the identifier in a data packet over a communications network.

3. The method of claim 1, wherein the providing an identifier associated with a third-party participant related to the communication interchange includes:
    providing the identifier over a communications network during at least one of: one or more of a real-time voice conversation, a conference call, a voice mail access, an instant messaging session, an internet chat session, a voice mail transfer, a voice mail interchange, a conversion of a voice mail to a text message, and a conversion of a text message to a voice message.

4. The method of claim 1, wherein the providing an identifier associated with a third-party participant related to the communication interchange includes:
    providing the identifier as a caller identifier (CID) of a single caller over a communications network.

5. The method of claim 1, wherein the matching the identifier with the third-party participant in the database storing one or more lists of possible third-party participants includes:
    conveying an alphanumeric matching of the identifier including statistical probabilities for a match from the database storing the one or more lists of possible third-party participants.

6. The method of claim 1, wherein obtaining context data associated with the identifier regarding a group-type characteristic of the third-party participant for purposes of communication interchange with at least another participant includes:
    generating the context data by extracting from the database one or more groups of which the third party participant is a member.

7. The method of claim 6, wherein the generating the context data by extracting from the database one or more groups of which the third party participant is a member includes:
    extracting from the database the groups of which the third party participant is a member including a given group in the one or more groups that the third party participant is a sole member and a given group of the one or more groups that the third party participant is one of a plurality of members.

8. The method of claim 1, wherein the obtaining context data associated with the identifier regarding a group-type characteristic of the third-party participant for purposes of communication interchange with at least another participant includes:
generating the group-type characteristic of the third-party participant by searching one or more of the database storing one or more lists of possible third-party participants, a computing device coupled to one or more participants of the communication interchange, or a server coupled to the communications network.

9. The method of claim 1, wherein the obtaining context data associated with the identifier regarding a group-type characteristic of the third-party participant for purposes of communication interchange with at least another participant includes:
displaying the context data associated with the identifier regarding the group-type characteristic of the third-party participant during a message composition.

10. The method of claim 1, wherein the obtaining context data associated with the identifier regarding a group-type characteristic of the third-party participant for purposes of communication interchange with at least another participant includes:
providing an option to allow display of the context data to the at least another participant of the communication interchange.

11. The method of claim 10, wherein the providing an option to allow display of the context data to the at least another participant of the communication interchange includes:
providing the option to allow display of the context data during one or more of a conference call, an internet chat, or a conversation over a mobile communication network.

12. The method of claim 1, wherein obtaining context data associated with the identifier regarding a group-type characteristic of the third-party participant for purposes of communication interchange with at least another participant includes:
generating the context data by extracting from the database one or more group-type characteristics shared by the third-party participant and the at least another participant.

13. The method of claim 12, wherein the generating the context data by extracting from the database one or more group-type characteristics shared by the third-party participant and the at least another participant includes:
extracting the one or more group-type characteristics shared by the third-party participant and the at least another participant including an indication of one or more of: an educational relationship, a contact relationship, a sales relationship, a network relationship, an environmental relationship, a proximity relationship, a contrary relationship, a religious relationship, a fiduciary relationship, and a political relationship.

14. The method of claim 1, wherein the enabling a user interface to display the group-type characteristic includes:
instantiating the user interface as a pop-up display during the communication interchange.

15. The method of claim 1, wherein the enabling a user interface to display the group-type characteristic includes:
enabling display of the group-type characteristic to the at least another participant when the at least another participant is a recipient in the communication interchange.

16. The method of claim 1, wherein the enabling a user interface to display the group-type characteristic includes:
displaying the group-type characteristic to two or more participants of the communication interchange.

17. The method of claim 1, wherein the enabling a user interface to display the group-type characteristic includes:
providing an interactive option to the user interface to enable adding or commenting on the group-type characteristic.

18. The method of claim 1, wherein the enabling a user interface to display the group-type characteristic includes:
enabling the user interface to allow selectively generating the group-type characteristic from the context data, the context data indicating to a primary participant whether or not to participate or allow a participant to participate in the communications interchange.

19. The method of claim 1, wherein the enabling a user interface to display the group-type characteristic includes:
enabling the user interface to allow input of context data, which indicates whether or not to allow a participant to participate in the communications interchange, to the database before, during and after the communication interchange.

20. The method of claim 1, wherein the enabling the user interface to selectively generate the group-type characteristic from the context data includes:
enabling the user interface to selectively generate the group-type characteristic from the context data before, during, or after the communication interchange.

21. The method of claim 1, wherein the enabling a user interface to display the group-type characteristic includes:
enabling the user interface to optionally display peripheral data concerning the group-type characteristic.

22. The method of claim 21, wherein the enabling the user interface to optionally display peripheral data concerning the group-type characteristic includes:
enabling the user interface to display data concerning members of each group of a plurality of groups of which the third party participant is a member.

23. The method of claim 22, wherein the enabling the user interface to display data concerning members of each group of which the third party participant is a member includes:
transmitting one or more of the data concerning members of each group of which the third party participant is a member or a pointer to a location on a device holding the data concerning the members of each group of which the third party participant is a member.

24. The method of claim 21, wherein the enabling the user interface to optionally display peripheral data concerning the group-type characteristic includes:
enabling the user interface to display data concerning a number of accesses to the group-type characteristic of the third-party participant.

25. The method of claim 24, wherein the enabling the user interface to display data concerning a number of accesses to the group-type characteristic of the third-party participant includes:
recording the number of accesses to the group-type characteristic over a period of time.

26. The method of claim 1 further comprising receiving the identifier with a computer system via a network, and wherein providing an identifier associated with a third-party participant related to the communication interchange includes providing the identifier received via the network internal to the computer system.

27. The method as recited in claim 1, wherein the one or more data includes context data.

\* \* \* \* \*